United States Patent
Ohta

(10) Patent No.: US 10,759,206 B2
(45) Date of Patent: Sep. 1, 2020

(54) RECORDING METHOD AND RECORDING APPARATUS

(71) Applicant: Seiko Epson Corporation, Tokyo (JP)

(72) Inventor: Hitoshi Ohta, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/145,277

(22) Filed: Sep. 28, 2018

(65) Prior Publication Data
US 2019/0100048 A1    Apr. 4, 2019

(30) Foreign Application Priority Data
Sep. 29, 2017   (JP) .................. 2017-190597

(51) Int. Cl.
| | |
|---|---|
| *B41J 11/00* | (2006.01) |
| *B41M 5/00* | (2006.01) |
| *B41M 7/00* | (2006.01) |
| *C09D 11/322* | (2014.01) |
| *C09D 11/12* | (2006.01) |
| *C09D 11/36* | (2014.01) |
| *C09D 11/107* | (2014.01) |
| *C09D 11/102* | (2014.01) |
| *C09D 11/38* | (2014.01) |

(Continued)

(52) U.S. Cl.
CPC .......... *B41M 5/0023* (2013.01); *B41J 11/002* (2013.01); *B41J 11/0015* (2013.01); *B41M 5/0017* (2013.01); *B41M 7/00* (2013.01); *B41M 7/009* (2013.01); *C09D 11/102* (2013.01); *C09D 11/107* (2013.01); *C09D 11/12* (2013.01); *C09D 11/322* (2013.01); *C09D 11/36* (2013.01); *C09D 11/38* (2013.01); *C09D 11/40* (2013.01); *C09D 11/54* (2013.01)

(58) Field of Classification Search
CPC ....... B41J 2/2114; B41J 11/00; B41J 11/0015; B41J 11/002; B41J 2/01; B41J 15/04; C08F 2/50; G03F 7/031; C09D 11/101
See application file for complete search history.

(56) References Cited

U.S. PATENT DOCUMENTS

| | | | |
|---|---|---|---|
| 9,403,393 B2 | 8/2016 | Aoyama et al. | |
| 9,802,433 B2 | 10/2017 | Aoyama et al. | |
| 10,370,551 B2 | 8/2019 | Watanabe et al. | |

(Continued)

FOREIGN PATENT DOCUMENTS

| | | |
|---|---|---|
| CN | 104512140 A | 4/2015 |
| JP | 2017-105134 A | 6/2017 |

(Continued)

*Primary Examiner* — Kristal Feggins
(74) *Attorney, Agent, or Firm* — Harness, Dickey & Pierce, P.L.C.

(57) ABSTRACT

A recording method uses an ink composition containing a colorant, resin particles, an organic solvent and water, and an aggregating liquid containing a coagulant for aggregating components of the ink composition. The method includes adhering the aggregating liquid to a recording region of a recording medium; adhering the ink composition to the recording region by ejecting the ink composition from a recording head; and drying the recording region to which the aggregating liquid and the ink composition are adhered such that an amount of the organic solvent in the recording region is 2.0 mg/inch$^2$ or less to obtain a recorded material.

22 Claims, 1 Drawing Sheet

(51) Int. Cl.
   *C09D 11/40*   (2014.01)
   *C09D 11/54*   (2014.01)

(56) References Cited

U.S. PATENT DOCUMENTS

| | | |
|---|---|---|
| 2015/0091974 A1 | 4/2015 | Aoyama et al. |
| 2016/0303881 A1 | 10/2016 | Aoyama et al. |
| 2017/0166767 A1 | 6/2017 | Watanabe et al. |

FOREIGN PATENT DOCUMENTS

| | | | | |
|---|---|---|---|---|
| JP | 2017-110182 A | | 6/2017 | |
| KR | 20150039556 | * | 4/2015 | ................ B41J 2/01 |

* cited by examiner

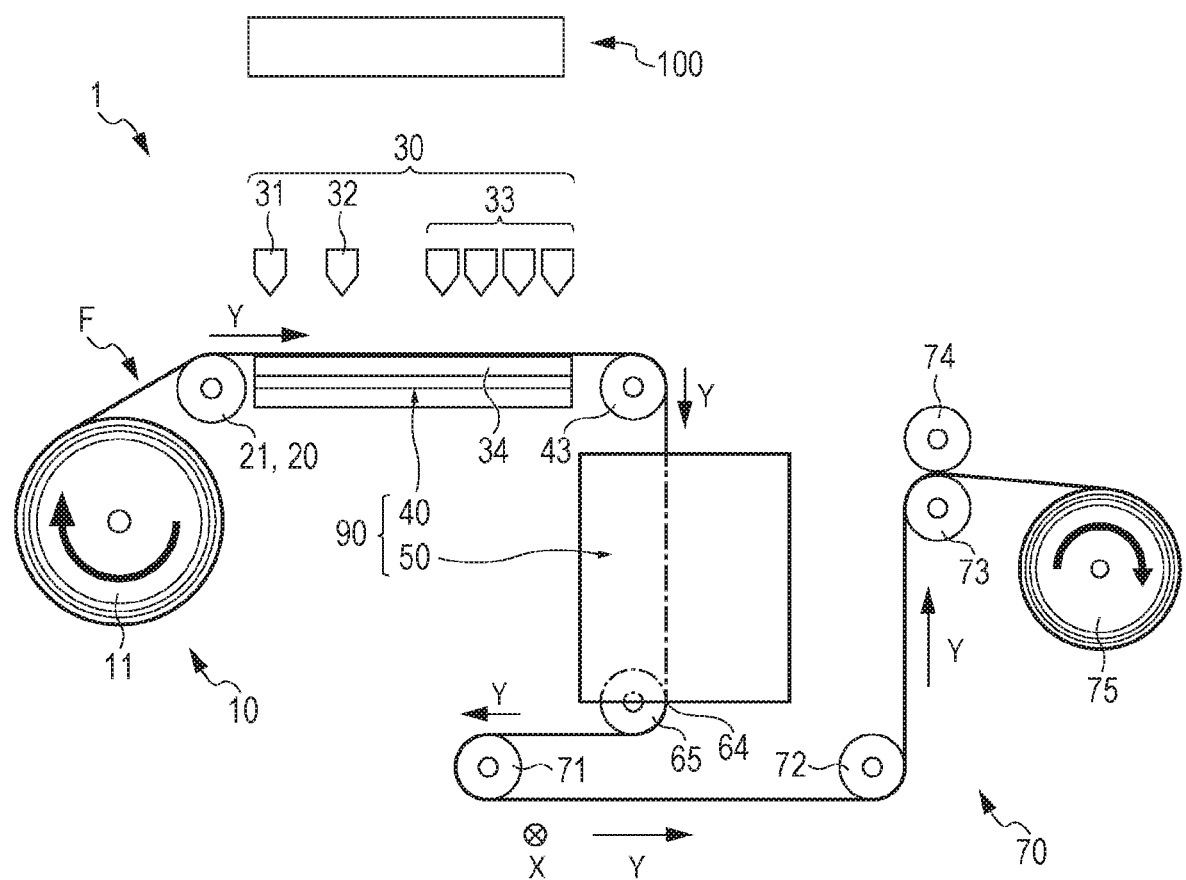

RECORDING METHOD AND RECORDING APPARATUS

BACKGROUND

1. Technical Field

The present invention relates to a recording method and a recording apparatus.

2. Related Art

The ink jet recording method is able to record high-definition images with a relatively simple apparatus, thus has achieved rapid development in various fields. Among these, various investigations have been made on obtaining a recorded material of higher quality in a more stable manner.

For example, JP-A-2017-105134 discloses a maintenance method of an ink jet recording apparatus having a recording head having a nozzle forming surface on which a nozzle for ejecting each of an ink composition containing a colorant and polymer particles and an aggregating liquid containing a coagulant capable of aggregating components of the ink composition is formed in order to provide a maintenance method of a recording apparatus which is able to achieve excellent cleaning property and clogging recovery in a case where recording is performed using an ink composition containing polymer particles and an aggregating liquid. The maintenance method includes a wiping step of wiping the nozzle forming surface of the recording head with a cleaning liquid and an absorbing member. The polymer particle has a core-shell structure having a core polymer and a shell polymer, and has an acid value of 20 mgKOH/g or more. The shell polymer has the glass transition temperature higher than that of the core polymer.

In the recording method disclosed in JP-A-2017-105134, a recorded material having excellent image quality can be obtained due to the use of the aggregating liquid. However, there is room for improvement in the durability of the image, particularly among the durability, blocking resistance and lamination resistance since an organic solvent is left in an ink layer of the obtained recorded material in a large amount.

SUMMARY

An advantage of some aspects of the invention is to provide a recording method capable of obtaining a recorded material excellent in image quality and image durability.

As a result of intensive studies, the present inventors have found that a recorded material excellent in image durability can be obtained by a recording method using an ink composition containing a colorant, resin particles, an organic solvent and water, and an aggregating liquid containing a coagulant for aggregating components of the ink composition, which includes adhering the aggregating liquid to a recording region of a recording medium; adhering the ink composition to the recording region by ejecting the ink composition from a recording head; and drying the recording region to which the aggregating liquid and the ink composition are adhered to obtain a recorded material, thereby completing the invention.

According to an aspect of the invention, provided is a recording method using an ink composition containing a colorant, resin particles, an organic solvent and water, and an aggregating liquid containing a coagulant for aggregating components of the ink composition, the method including: adhering the aggregating liquid to a recording region of a recording medium; adhering the ink composition to the recording region by ejecting the ink composition from a recording head; and drying the recording region to which the aggregating liquid and the ink composition are adhered such that an amount of the organic solvent in the recording region is 2.0 mg/inch$^2$ or less to obtain a recorded material. The image quality and durability of the recorded material are excellent by the recording method.

It is preferable that the recording method further include the following features.

In the method, it is preferable that the content of an organic solvent having a normal boiling point exceeding 280° C. be 3.0 mass % or less based on the total amount of the ink composition.

It is preferable that the method further include drying the recording region to which the aggregating liquid is adhered such that the water content of the recording region is 0.5 mg/inch$^2$ or less before the adhering of the ink composition.

In the method, it is preferable that the aggregating liquid contain an organic solvent and water.

In the method, it is preferable that the recording medium be dried at a temperature equal to or higher than the glass transition point of the resin particles contained in the ink composition in the drying.

In the method, it is preferable that the recording medium be a low-absorbing recording medium or a non-absorbing recording medium.

In the method, it is preferable that the recording region include a region in which an amount of the adhered ink composition is 9 to 25 mg/inch$^2$ in the adhering of the ink composition.

In the method, it is preferable that the ink composition further contain a wax.

In the method, it is preferable that the drying be performed by any one of air blowing, radiation irradiation, and heat transfer.

In the method, it is preferable that the organic solvent contained in the ink composition contain a resin solvent.

In the method, it is preferable that the content of the resin solvent be 30 to 80 mass % based on the total amount of the organic solvent contained in the ink composition.

In the method, it is preferable that the coagulant contained in the aggregating liquid be at least one of cationic resin, organic acid, and polyvalent metal salt.

In the method, it is preferable that the recorded material be laminated.

According to another aspect of the invention, provided is a recording apparatus for performing a recording by the recording method according to the first aspect of the invention.

BRIEF DESCRIPTION OF THE DRAWING

The invention will be described with reference to the accompanying drawing, wherein like numbers reference like elements.

FIGURE is a side view schematically showing an overall outline of an example of an ink jet recording apparatus that can be used in the present embodiment.

DESCRIPTION OF EXEMPLARY EMBODIMENTS

Hereinafter, an embodiment of the invention (hereinafter referred to as "present embodiments") will be described in detail. However, the invention is not limited to the embodiments, and various modifications and improvements are available as long as they do not impart the scope of claims. In the drawing, the same reference numerals are given to the same elements, and redundant explanations are omitted. The positional relationship such as up, down, left, and right is based on the positional relationship shown in the drawing unless otherwise noted. The dimensional ratios of the drawing are not limited to the illustrated ratios.

Recording Method

A recording method according to the present embodiment uses an ink composition containing a colorant, resin particles, an organic solvent and water, and an aggregating liquid containing a coagulant for aggregating components of the ink composition. In particular, the recording method according to the present embodiment includes adhering the aggregating liquid to a recording region of a recording medium; adhering the ink composition to the recording region by ejecting the ink composition from a recording head; and drying the recording region to which the aggregating liquid and the ink composition are adhered such that an amount of the organic solvent in the recording region is 2.0 mg/inch$^2$ or less to obtain a recorded material. The ink composition may be adhered after the aggregating liquid is adhered to the recording region, the ink composition may be adhered before the aggregating liquid is adhered, or alternatively, the ink composition may be adhered at the same time when the aggregating liquid is adhered. Drying may be performed simultaneously with or after adhering the aggregating liquid and the ink composition.

By using the recording method according to the present embodiment, a recorded material excellent in image quality and excellent in image durability can be obtained. Further, with the recording method according to the present embodiment, in addition to being able to obtain the recorded material having excellent image quality and image durability, excellent clogging resistance is also achieved.

The reason why such a recording method is excellent in image quality and a recorded material excellent in image durability is considered as follows but not limited to the followings. In a conventional recording method, even if the method includes a drying step, the drying step merely enables that water content contained in a large amount in the ink composition and the aggregating liquid is mainly evaporated to reduce or remove the amount of moisture remaining in the image of the recorded material. However, an organic solvent, particularly an organic solvent having a higher boiling point than water, is not removed to a predetermined amount or less. Consequently, the recorded material excellent in durability is often difficult to be obtained due to the organic solvent remaining in the predetermined amount or more. This is because the drying step in the conventional recording method is provided to handle the recorded material without smearing even when touching or scrubbing the surface of the recorded material, and carried out to the extent to ensure a certain degree of durability of the recorded material. On the other hand, in the recording method according to the first aspect of the invention, the recording region is dried to which the ink composition of the recording medium is adhered such that the amount of the organic solvent in the recording region is 2.0 mg/inch$^2$ or less. Thus, deterioration of the durability of the image due to the remaining organic solvent is suppressed. By using the recording method according to the present embodiment, it is possible to obtain the recorded material excellent in image quality due to the aggregating liquid, and excellent in image durability due to the drying step capable of achieving the remaining amount of the organic solvent.

Furthermore, when the ink composition is ejected from the recording head, the composition can contain an organic solvent to the extent that solid components do not stick to the recording head. Consequently, the recording method according to this embodiment can achieve excellent clogging resistance. Since the resin is dissolved by the solvent contained in the ink composition to promote fixation to the recording medium, the recorded material is excellent in durability.

Ink Composition

The ink composition according to the present embodiment includes a colorant, resin particles, an organic solvent, and water, and is used in a recording method using the ink composition and an aggregating liquid containing a coagulant for aggregating the components of the ink composition. By using such an ink composition in the recording method using the ink composition and the aggregating liquid containing the coagulant for aggregating the components of the ink composition, the durability and image quality of the obtained recorded material are improved.

Colorant

The ink composition according to the present embodiment is a colored ink composition containing a colorant. As the colorant, a pigment can be used. As the pigment, although not particularly limited, for example, the following pigments are preferable.

Carbon black used for black ink is not particularly limited, but examples thereof include No. 2300, No. 900, MCF 88, No. 33, No. 40, No. 45, No. 52, MA7, MA8, MA100, No. 2200B, etc. (collectively manufactured by Mitsubishi Chemical Corporation); Raven 5750, Raven 5250, Raven 5000, Raven 3500, Raven 1255, Raven 700, etc. (collectively manufactured by Columbia Carbon Co., Ltd.); Rega 1 400 R, Rega 1 330 R, Rega 1 660 R, Mogul L, Monarch 700, Monarch 800, Monarch 880, Monarch 900, Monarch 1000, Monarch 1100, Monarch 1300, Monarch 1400, etc. (collectively manufactured by CABOT JAPAN K.K.); Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (collectively manufactured by Degussa).

A pigment used for white ink is not particularly limited, but examples thereof include C.I. Pigment White 6, 18, 21, titanium oxide, zinc oxide, zinc sulfide, antimony oxide, zirconium oxide, white hollow resin particles and polymer particles.

A pigment used for yellow ink is not particularly limited, but examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

A pigment used for magenta ink is not particularly limited, but examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245, or alternatively, C.I. Pigment Violet 19, 23, 32, 33, 36, 38, 43, and 50.

A pigment used for cyan ink is not particularly limited, but examples thereof include C.I. Pigment Blue 1, 2, 3, 15, 15:1, 15:2, 15:3, 15:34, 15:4, 16, 18, 22, 25, 60, 65, and 66; C.I. Vat Blue 4, and 60.

Pigments other than the ones described above are not particularly limited, but examples thereof include C.I. Pigment Green 7 and 10; C.I. Pigment Brown 3, 5, 25, and 26; C.I. Pigment Orange 1, 2, 5, 7, 13, 14, 15, 16, 24, 34, 36, 38, 40, 43, and 63.

It is preferable that the colorant contain one or more pigments selected from the group consisting of a self-dispersion pigment and a polymer dispersion pigment. Accordingly, the recorded material tends to be more excellent in glossiness because the colorant is uniformly dispersed in the recorded material.

The self-dispersion pigment is a pigment having a hydrophilic group on its surface. As the hydrophilic group, it is preferable that hydrophilic group be at least one selected from the group consisting of —OM, —COOM, —CO—, $SO_3M$, —$SO_2M$, —$SO_2NH_2$, —$RSO_2M$, —$PO_3HM$, —$PO_3M_2$, —$SO_2NHCOR$, —$NH_3$, and —$NR_3$.

In these chemical formulae, M represents a hydrogen atom, an alkali metal, ammonium, a phenyl group optionally having a substituent, or an organic ammonium, and R represents an alkyl group having 1 to 12 carbon atoms or a naphthyl group optionally having a substituent. M and R are independently selected.

The self-dispersion pigment is, in particular, obtained by subjecting a pigment to physical treatment and/or chemical treatment, and bonding (grafting) the hydrophilic group to the surface of the pigment. Specific examples of the physical treatment include vacuum plasma treatment and the like. Specific examples of the chemical treatment include a wet oxidation in which oxidation is carried out with an oxidizing agent in water, a method in which a carboxyl group is bonded via a phenyl group by bonding p-aminobenzoic acid to the surface of the pigment, and the like.

The polymer dispersion pigment is a pigment which is dispersible in a liquid by a polymer. The content of the polymer relative to the pigment can be expressed as a coverage of the polymer coating the pigment. The coverage of the polymer is preferably 1.0 to 50%, more preferably 1.0 to 10%, still more preferably 1.0 to 5.0%. In a case where the coverage is 1.0% or more, the dispersibility tends to be enhanced. In a case where the coverage is 50% or less, there is a tendency for the coloring property to be further improved, and in a case where the coverage is 5.0% or less, there is a tendency for the coloring property to be still further improved.

It is preferable that 70 mass % or more of constituent components of the polymer is a polymer obtained by copolymerization of (meth)acrylate and (meth)acrylic acid. The fixing property and glossiness of the ink tend to be more excellent. It is more preferable that at least one of alkyl (meth)acrylate having 1 to 24 carbon atoms and cyclic alkyl (meth)acrylate having 3 to 24 carbon atoms be polymerized from a monomer component having 70 mass % or more. Specific examples of the monomer components include methyl (meth)acrylate, ethyl (meth)acrylate, propyl (meth)acrylate, n-butyl (meth)acrylate, isobutyl (meth)acrylate, 2-ethylhexyl (meth)acrylate, hexyl (meth)acrylate, pethyl (meth)acrylate, octyl (meth)acrylate, nonyl (meth)acrylate, decyl (meth)acrylate, t-butylcyclohexyl (meth)acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentenyl (meth)acrylate, dicyclopentenyl (meth)acrylate, dicyclopentenyloxy (meth)acrylate, and behenyl (meth)acrylate. Furthermore, examples of other monomer components for polymerization include hydroxyl group-containing hydroxy (meth)acrylates such as hydroxyethyl (meth)acrylate, hydroxypropyl (meth)acrylate, diethylene glycol (meth)acrylate and the like, urethane (meth)acrylate, epoxy (meth)acrylate and the like. In the specification, "(meth)acrylate" is a term including both "methacrylate" and "acrylate."

In the ink composition, the content of the colorant is preferably 0.1 to 20 mass %, more preferably 1.0 to 15 mass %, still more preferably 3.0 to 10% by mass, in terms of solid content based on the total amount (100 mass %) of the ink composition. In a case where the content of the colorant falls within the above range, there is a tendency for the coloring property to be further improved.

Resin Particles

The resin particles (hereinafter also referred to as "resin dispersion" or "resin emulsion") according to the present embodiment are particles containing a resin. The resin particles according to the present embodiment may be self-dispersion resin particles into which a hydrophilic component needed for stably dispersing in water is introduced, or resin particles exhibiting dispersibility by using an external emulsifier.

Examples of the resin include a (meth)acrylic resin, a urethane resin, an epoxy resin, a polyolefin resin, a styrene acrylic resin, a fluorene resin, a rosin modified resin, a terpene resin, a polyester resin, a polyamide resin, a vinyl chloride resin, a vinyl chloride-vinyl acetate copolymer, and an ethylene vinyl acetate-based resin. Among these, one or more selected from the group consisting of a (meth)acrylic resin, a urethane resin, an epoxy resin, a polyolefin resin, and a styrene acrylic resin is preferable, and one or more selected from the group consisting of a urethane resin and a styrene acrylic resin. These resins may be used alone or in combination of two or more.

The "(meth)acrylic resin" means a resin having a (meth)acrylic skeleton. The (meth)acrylic resin is not particularly limited, but examples thereof include polymers of (meth)acrylic monomers such as (meth)acrylic acid, (meth)acrylic acid ester, (meth)acrylamide and the like, and copolymers of (meth)acrylic monomers. As other monomers, vinyl monomers such as styrene can be considered. Thus, as the (meth)acrylic monomer which is a copolymer of a (meth)acrylic monomer and another monomer, a styrene acrylic resin can be considered. In the specification, "(meth)acryl" is a term including both "methacryl" and "acryl."

Examples of the urethane resin include, a polyether type urethane resin having an ether bond in the main chain, a polyester type urethane resin having an ester bond in the main chain, and a polycarbonate type urethane resin containing a carbonate bond in the main chain, in addition to a urethane bond. Among these, a polyester type urethane resin containing an ester bond in the main chain is preferable. These urethane resins may be used alone or in combination of two or more.

Commercially available products of urethane resin include UW-1501F, UW-5002 (trade names of Ube Industries); W-6061, W-6110 (trade names of Mitsui Chemicals); and UX-150, UX-390, UX-200 (trade names of Sanyo Chemical Industries).

Examples of the styrene acrylic resin include copolymers of aromatic vinyl monomers such as styrene, α-methyl styrene, vinyl toluene, 4-t-butyl styrene, chlorostyrene, vinyl anisole and vinyl naphthalene, with the aforementioned monomers used in (meth)acrylic resins. Publicly known resins may be appropriately used. Among these, the styrene acrylic resin described in the Examples described later is preferable.

The glass transition temperature (Tg) of the resin particles is preferably −50° C. or higher and 200° C. or lower, more preferably 0° C. or more and 150° C. or less, still more preferably 50° C. or more and 100° C. or less. In a case where the glass transition temperature (Tg) of the resin particles falls within the above range, durability and clogging resistance tend to be more improved. As a method for measuring the glass transition temperature, publicly known measurement methods can be used. For example, the glass transition temperature can be measured using a differential scanning calorimeter "DSC 7000" (manufactured by Hitachi High-Tech Science) according to JIS K 7121 (method for measuring the transition temperature of plastics).

In the ink composition, the content of the resin particles is preferably 1.0 to 20 mass %, more preferably 3.0 to 15 mass %, still more preferably 5.0 to 10% by mass, in terms of solid content based on the total amount (100 mass %) of the ink composition. In a case where the content of the resin particles falls within the above range, durability and clogging resistance tend to be more improved.

The resin microparticles are not limited, but it is preferable that resin microparticles have a SP value of 13 (cal/cm$^3$)$^{1/2}$ or less. It is more preferable that the SP value of the resin be 9 to 12 (cal/cm$^3$)$^{1/2}$ or less. In a case where the SP value of the resin falls within the above range, the resin is easily obtained or prepared. The definition of the SP value is the same as that described later.

Organic Solvent

The ink composition according to the present embodiment contains an organic solvent. It is preferable that the organic solvent contain an organic solvent having a normal boiling point of 280° C. or lower. The normal boiling point of the organic solvent is more preferably 160 to 270° C., still more preferably 180 to 250° C. In a case where the normal boiling point of the organic solvent falls within the above range, the image quality and durability of recorded material and clogging resistance are particularly improved. In the ink composition according to the present embodiment, the content of the organic solvent having a normal boiling point of 280° C. or higher is preferably 3.0 mass % or less, more preferably 2.0 mass % or less, even more preferably 1.0 mass % or less, still more preferably 0.5 mass % or less, further still more preferably 0.1 mass % or less based on the total amount (100 mass %) of the ink composition. The lower limit of the content is 0 mass %. There is a tendency for scratch resistance and image quality to be further improved due to the fact that the drying property of the ink composition landed on the recording medium can be obtained at a higher level.

As an organic solvent, a solvent capable of swelling and/or dissolving a resin component such as the resin particles used in the invention at a temperature in the vicinity of the heating temperature in the drying step described later is preferable. In particular, in a case where the SP value of the resin of the resin solvent and the resin particles falls within the range shown below, the effect is remarkably exhibited.

It is preferable that the organic solvent according to the present embodiment contain a resin solvent capable of swelling and/or dissolving resin particles. In the specification, the "resin solvent" refers to a solvent capable of swelling and/or dissolving the resin component such as resin particles used in the invention at a temperature in the vicinity of the heating temperature in the drying step described later. In particular, in a case where the SP value of the resin of the resin solvent and the resin particles falls within the range shown below, the effect is remarkably exhibited.

As the organic solvent according to the present embodiment, it is preferable that an organic solvent having an absolute value of the difference between the SP values of the organic solvent and the resin of the resin particles be 3.0 (cal/cm$^3$)$^{1/2}$ or less. The difference in the SP values is more preferably 2.0 (cal/cm$^3$)$^{1/2}$ or less, still more preferably 1.0 (cal/cm$^3$)$^{1/2}$ or less.

Among the organic solvents contained in the ink composition, an organic solvent having an absolute value of the difference in SP values of the organic solvent and the resin microparticles contained in the ink of 1.0 (cal/cm$^3$)$^{1/2}$ or less is referred to as a resin solvent. The resin solvent can also be defined as an organic solvent capable of swelling and/or dissolving the resin particles.

The content of the resin solvent relative to the total amount of the organic solvent contained in the ink composition is preferably 10 to 80 mass %, and from the viewpoint of particularly excellent durability, more preferably 30 mass % or more, still more preferably 40 mass %, and further still more preferably 50 mass % or more. On the other hand, from the viewpoint of particularly excellent clogging resistance, it is more preferably 70 mass % or less, still more preferably 60 mass % or less, particularly preferably 40 mass % or less.

In a case where the content of the resin solvent with respect to the total amount of the organic solvent contained in the ink composition falls within the above range, it is preferable as follows. That is, by containing the resin solvent in an amount falling in the extremely preferable range described above, even when the ink is dried due to moisture evaporation from a tip of an ink ejection nozzle of the recording head, the resin solvent ratio can be set below the range capable of swelling and/or dissolving the resin particles, thereby suppressing nozzle clogging of the recording head. Furthermore, when the ink is applied to the recording medium, the proportion of the resin solvent increases as the moisture/organic solvent volatilizes in the drying step performed after applying the ink. By heating in the drying step, swelling and/or dissolution of the resin particles are promoted, and the ink layer is efficiently coated, thereby improving the durability of the recorded material.

The SP value of the organic solvent is not particularly limited, but it is preferably 11 to 17 (cal/cm$^3$)$^{1/2}$, more preferably 11.5 to 15 (cal/cm$^3$)$^{1/2}$, still more preferably 12 to 13 (cal/cm$^3$)$^{1/2}$. In a case where the SP value of the organic solvent falls within the above range, the difference in the SP values of the organic solvent and the resin of the resin microparticles is easily adjustable within the above range.

The resin solvent is a solvent capable of swelling and/or dissolving the resin component such as resin particles contained in the ink composition at a temperature in the vicinity of the heating temperature in the drying step described later.

In the specification, the SP value (solubility parameter) is a value expressed by the square root of molecular aggregation energy. The section is (MPa)1/2, which means a value at 25° C. The SP value is defined in Polymer HandBook (Second Edition) "Chapter IV. Solubility Parameter Values". Furthermore, for those without available data, the SP value can be calculated by the method described in R. F. Fedors, Polymer Engineering Science, 14, pp. 147-154 (1974).

The organic solvent having a normal boiling point of less than 280° C. and the organic solvent and the resin solvent having a normal boiling point of 280° C. or higher can be appropriately selected from the following organic solvents.

A type of the organic solvent is not particularly limited, but examples thereof include a cyclic nitrogen compound, an aprotic polar solvent, a monoalcohol, an alkylpolyol, and a glycol ether.

The aprotic polar solvent is not particularly limited, but examples thereof include a cyclic ketone compound, a chain ketone compound, and a chain nitrogen compound. Representative examples of the cyclic nitrogen compound and the aprotic polar solvent include a pyrrolidone solvent, an imidazolidinone solvent, a sulfoxide solvent, a lactone solvent, and an amide ether solvent. In particular, among these, lactams such as 2-pyrrolidone, N-alkyl-2-pyrrolidone, 1-alkyl-2-pyrrolidone, γ-butyrolactone, etc.; and amide ethers such as 1,3-dimethyl-2-imidazolidinone, dimethylsulfoxide, imidazole, 1-methylimidazole, 2-methylimidazole, 1,2-dimethylimidazole, N, N-dimethylpropanamide including 3-methoxy-N,N-dimethylpropionamide and 3-butoxy-N, N-dimethylpropanamide and the like, etc. can be considered.

The monoalcohol is not particularly limited, but examples thereof include methanol, ethanol, n-propyl alcohol, iso-propyl alcohol, n-butanol, 2-butanol, tert-butanol, iso-butanol, n-pentanol, 2-pentanol, 3-pentanol, and tert-pentanol.

The alkyl polyol is not particularly limited, but examples thereof include glycerin, ethylene glycol, diethylene glycol, triethylene glycol, propylene glycol (1,2-propane diol), dipropylene glycol, 1,3-propylene glycol (1,3-propanediol), isobutylene glycol (2-methyl-1,2-propanediol), 1,2-butanediol, 1,3-butanediol (1,3-butylene glycol), 1,4-butanediol, 2-butene-1,4-diol, 1,2-pentanediol, 1,5-pentanediol, 2-methyl-2,4-pentanediol, 1,2-hexanediol, 1,6-hexanediol, 2-ethyl-1,3-hexanediol, 1,7-heptanediol, and 1,8-octanediol.

Among these alkyl polyols, alkyl diols having an alkyl group having 5 or more carbon atoms are preferable from the viewpoint of excellent image quality of recorded material and the like.

Among these alkyl polyols, alkyl polyols having an alkyl group having 4 or less carbon atoms, polyalkyl polyols in which two or more molecules of alkyl polyols are condensed with each other among hydroxyl groups, and alkyl polyols which is a triol or higher are preferred in terms of excellent clogging resistance.

In a case where the content of alkyl polyol having a normal boiling point of 280° C. or higher in the ink composition is 3 mass % or less, from the viewpoint of particularly excellent durability and image quality of the recorded material. It is more preferably 1 mass % or less, still more preferably 0.5 mass % or less.

The glycol ether is not particularly limited, but examples thereof include diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-iso-propyl ether.

Alkanolamines are also included in organic solvents. Examples of alkanolamines include ethanolamine, propanolamine, triethanolamine, diethanolamine, triisopropanolamine and the like. These may also be used as pH adjusting agents for the ink.

Among the organic solvents, from the viewpoint that the SP value can be easily adjusted within the above range, cyclic nitrogen compounds, amide ethers, alkyl polyols are preferable.

The content of the organic solvent is preferably 3.0 to 70 mass %, more preferably 5.0 to 50 mass %, still more preferably 10 to 30 mass %, based on the total amount (100 mass %) of the ink composition. In a case where the content of the organic solvent is 70 mass % or less, there is a tendency for the drying property of the ink composition adhered to the recording medium to be further improved. In a case where the content of the organic solvent is 3.0 mass % or more, there is a tendency for the clogging resistance of the ink composition to be secured.

Wax

It is preferable that the ink composition according to the present embodiment further include wax. When the recording head is heated, there is a possibility that the resin particles agglutinate and stick accompanying with the evaporation of moisture, followed by nozzle clogging of the recording head, and stable ejection is hindered. The wax tends to suppress agglomeration of resin particles upon evaporation of moisture. Accordingly, it possible to suppress ejection failure and clogging caused by fixation of the resin particles to the nozzles of the recording head, thereby providing an ink composition having excellent recording stability. Furthermore, at the time of high temperature recording, the wax tends to prevent a film formed by the resin particles from being too brittle. Therefore, the ink composition is rarely deteriorated in scratch resistance even if it is subjected to high temperature recording.

The melting point of the wax is preferably 70 to 110° C., more preferably 80 to 110° C. In a case where the melting point falls within the above range, it is possible to obtain a recorded material which is more excellent in recording stability and hardly deteriorates in scratch resistance even at high temperature recording. The melting point can be measured with a differential scanning calorimeter (DSC). Furthermore, the melting point of the wax can be controlled, for example, by adjusting a ratio of structural units constituting the wax.

The wax is not particularly limited, but examples thereof include (meth)acryl wax, polyolefin wax such as polyethylene wax, and paraffin wax. The polyethylene wax is not particularly limited, but examples thereof include AQUACER 593 polyolefin wax (manufactured by BYK), Nopcoat PEM-17 (manufactured by San Nopco Limited), Polylon L787, Polylon L788 (collectively manufactured by Chukyo Yushi Co., Ltd.), and Chemipearl W4005 (manufactured by Mitsui Chemicals, Inc.). The wax may be synthesized by conventional methods. The wax may be used alone or in combination of two or more.

The content of the wax in the ink composition is preferably 0.1 to 2.5 mass %, more preferably 0.2 to 1.0 mass %, in terms of solid content based on the total amount (100 mass %) of the ink composition. In a case where the content of the wax falls within the above range, the recording stability is excellent and the scratch resistance tends to be less deteriorated even at high temperature recording.

Surfactant

From the viewpoint of glossiness, it is preferable that the ink composition further contain a surfactant. The surfactant is not particularly limited, and examples thereof include an acetylene glycol surfactant, a fluorine surfactant, and a silicone surfactant.

The acetylene glycol surfactant is not particularly limited, but one or more selected from an alkylene oxide adduct of 2,4,7,9-tetramethyl-5-decyne-4,7-diol and 2,4,7,9-tetramethyl-5-decyne-4,7-diol, and alkylene oxide adducts of 2,4-dimethyl-5-decyn-4-ol and 2,4-dimethyl-5-decyne-4-ol is preferable. Commercially available products of the acetylene glycol surfactant are not particularly limited, but examples thereof include E series such as Olfine 104 series and Olfine E 1010 (trade names, collectively manufactured by Air Products Japan); Surfynol 104, 465, 61, and DF 110D (trade names, collectively manufactured by Nissin Chemical Industry). The acetylene glycol surfactant may be used alone or in combination of two or more.

The fluorine surfactant is not particularly limited, but examples thereof include perfluoroalkyl sulfonate, perfluoroalkyl carboxylate, perfluoroalkyl phosphate ester, a perfluoroalkyl ethylene oxide adduct, perfluoroalkyl betaine, and a perfluoroalkyl amine oxide compound.

Commercially available products of the fluorine surfactant are not particularly limited, but examples thereof include S-144, S-145 (trade names, collectively manufactured by Asahi Glass); FC-170C, FC-430, Fluorad-FC4430 (trade names, collectively manufactured by Sumitomo 3M); FSO, FSO-100, FSN, FSN-100, FS-300 (trade names, collectively manufactured by Dupont); FT-250 and 251 (trade names, collectively manufactured by NEOS). The fluorine surfactant may be used alone or in combination of two or more.

The silicone surfactant is not particularly limited, but examples thereof include a polysiloxane-based compound, and polyether-modified organosiloxane. Commercially available products of the silicone surfactant are not particularly limited, but examples thereof include BYK-306, BYK-307, BYK-333, BYK-341, BYK-345, BYK-346, BYK-347, BYK-348, BYK-349 (trade names, collectively manufactured by BYK Japan); KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (trade names, collectively manufactured by Shin-Etsu Chemical); and the like. The silicone surfactant may be used alone or in combination of two or more.

The content of the surfactant in the ink composition is preferably 0.05 to 2.5 mass %, more preferably 0.1 to 1.5 mass %, still more preferably 0.3 to 1.0 mass %, based on the total amount (100 mass %) of the ink composition. In a case where the content of the surfactant falls within the above range, there is a tendency for the wettability of the ink composition adhered to the recording medium to be further improved.

Water

Examples of the water according to the present embodiment include pure water such as ion exchanged water, ultrafiltered water, reverse osmosis water, distilled water; and one in which ionic impurities are removed as much as possible, such as ultrapure water. The sterilized water obtained by irradiating with ultraviolet rays or adding hydrogen peroxide is desirably used because mold and bacteria can be prevented from generating in a case where the aggregating liquid is preserved for a long time. Consequently, there is a tendency for the storage stability to be further improved. The content of water in the ink composition is preferably 40 mass % or more, more preferably 50 mass % or more, still more preferably 60 mass % or more. Although the upper limit of the content of water is not limited, it is preferably 95 mass % or less.

The ink composition according to the present embodiment is preferably an aqueous ink composition. The "aqueous" means that at least water is a main ingredient as a solvent component contained in the composition, and the content of water in the composition is 30 mass % or more. The aqueous composition is preferable from the viewpoint of low pollution resistance, low toxicity, and high safety.

The ink composition may appropriately contain, as the other components, various additives such as a dissolution aid, a viscosity adjusting agent, a pH adjusting agent, an antioxidant, a preservative, a mildewproofing agent, a corrosion inhibitor, a chelate (for example, sodium ethylenediaminetetraacetate) for capturing metal ions affecting dispersion and the like.

Aggregating Liquid

The aggregating liquid according to the present embodiment contains a coagulant capable of aggregating the aforementioned ink composition. The "aggregation" means aggregating or thickening components contained in the ink composition, whereby the ink composition hardly flows or mixes with the recording medium.

By using the ink composition according to the present embodiment together with the aggregating liquid in the recording method, it is possible to obtain a recorded material having excellent image quality. The coagulant in the aggregating liquid interacts with the ink composition, and thus the aggregating liquid agglutinates the components contained in the ink composition to thicken or insolubilize the ink composition. Consequently, landing interference and blurring of the ink composition to be adhered thereafter can be suppressed, and lines, fine images and the like can be drawn homogeneously. Furthermore, the aggregating liquid promotes solid-liquid separation of the ink composition, whereby the amount of the organic solvent of the ink composition easily decreases in the drying step. Therefore, the time required for the drying step is shortened, or alternatively the required heating temperature is lowered.

Coagulant

The coagulant contained in the aggregating liquid is not particularly limited, but it is preferably one or more selected from the group consisting of a cationic resin, an organic acid, and a polyvalent metal salt. Consequently, there is a tendency for solid unevenness and blurring to be further suppressed. Among the components contained in the ink composition, examples of the components that aggregate by the coagulant include the aforementioned pigment, the resin used in the resin particles, and the wax.

The cationic resin is not particularly limited, but examples thereof include a cationic polymer. From the viewpoint of more effectively and reliably achieving the effect of the invention, examples of the cationic polymer include a cationic amine resin. Examples of the amine resin include a polyamine resin, a polyamide resin, a polacrylamide resin, a polyallylamine resin, a polyethyleneimine resin, and the like. These resins may be those respectively having a polyamine structure, a polyamide structure, a polacrylamide structure, a polyallylamine structure and a polyethyleneimine structure in a main skeleton of the polymer. The "amine" is a term also including quaternary ammonium. Therefore, the polyamine structure is a resin having lots of amino groups or quaternary ammonium groups in the main skeleton of the polymer.

Examples of the polyallylamine resin include allylamine resins such as polydiallylamine, polyallylamine and the like; alkylamine polymers; and polymers having primary to tertiary amino groups and quaternary ammonium bases described in JP-A-59-20696, JP-A-59-33176, JP-A-59-33177, JP-A-59-155088, JP-A-60-11389, JP-A-60-49990, JP-A-60-83882, JP-A-60-109894, JP-A-62-198493, JP-A-63-49478, JP-A-63-115780, JP-A-63-280681, JP-A-1-40371, JP-A-6-234268, JP-A-7-125411, JP-A-10-193776 and the like. From the same viewpoint, a weight average molecular weight of these cationic polymers is preferably 5,000 or more, more preferably about 5,000 to 100,000. The weight average molecular weight of the cationic polymer is measured by gel permeation chromatography using polystyrene as a standard substance.

The organic acid is not particularly limited, but is preferably a carboxylic acid, and examples thereof include maleic acid, acetic acid, phosphoric acid, oxalic acid, malonic acid, and citric acid. Among these, monovalent or divalent or higher valent carboxylic acid is preferable. By containing such a carboxylic acid, the aggregating effect of the polymer and the wax is further improved, and there is tendency for coloring property to be further enhanced. The organic acid may be used alone or in combination of two or more.

The polyvalent metal salt is not particularly limited, but a polyvalent metal salt of an inorganic acid or a polyvalent metal salt of an organic acid is preferable from the viewpoint of more effectively and reliably exhibiting the effect of the invention. Examples of such a polyvalent metal salt include, but are not limited to, salts of alkaline earth metals (for example, magnesium and calcium) of Group 2 of the periodic table, transition metals of Group 3 of the periodic table (for example, lanthanum), earth metals from Group 13 of the periodic table (for example, aluminum), and lanthanides (for example, neodymium). Furthermore, as salts of these polyvalent metals, carboxylic acid salts (for example, salts of formic acid, acetic acid, and benzoic acid), sulfuric acid salts, nitric acid salts, chlorides, and thiocyanic acid salts are suitable. Among these, as the polyvalent metal salt, it is preferably one or more selected from the group consisting of calcium salt or magnesium salt of carboxylic acid (salts of formic acid, acetic acid, benzoic acid, and the like), calcium salt or magnesium salt of sulfuric acid, calcium salt or magnesium salt of nitric acid, calcium chloride, magnesium chloride, and calcium salt or magnesium salt of thiocyanic acid. The polyvalent metal salt may be used alone or in combination of two or more.

The content of the coagulant is preferably 1.0 to mass %, more preferably 3.0 to 17.5 mass %, still more preferably 5.0 to 15 mass % in terms of solid content based on the total amount (100 mass %) of the aggregating liquid. In a case where the content of the coagulant falls within the above range, there is a tendency for solid unevenness and blurring to be further suppressed.

The aggregating liquid used in the present embodiment may contain the same surfactant, organic solvent and water as those used in the ink composition described above. Furthermore, the aggregating liquid may appropriately contain, as the other components, various additives such as a dissolution aid, a viscosity adjusting agent, a pH adjusting agent, an antioxidant, a preservative, a mildewproofing agent, a corrosion inhibitor, a chelate for capturing metal ions affecting dispersion and the like.

It is also preferable that the aggregating liquid contain an organic solvent and water, and the organic solvent be independently same as the preferred organic solvent that may contain in the above-described ink composition as described above. An aqueous aggregating liquid may be adopted.

Aggregating Liquid Adhering Step

The aggregating liquid adhering step is a step of adhering the aggregating liquid to the recording region of the recording medium. A device for adhering the aggregating liquid is not particularly limited, but examples thereof include roller coating, spray coating and ink jet method. Among these, it is preferable that the aggregating liquid be adhered by the ink jet method. By adhering the aggregating liquid by the ink jet method, the usage amount of the aggregating liquid can be suppressed to the minimum necessary amount since the aggregating liquid can be applied only in the necessary amount only to the necessary part, and there is a tendency for suppressing of change in the medium surface quality and scratch resistance to be further improved.

The adhesion amount of the aggregating liquid to the recording region of the recording medium is, in terms of liquid amount, preferably 0.01 to 15.0 mg/inch$^2$, more preferably 0.1 to 10 mg/inch$^2$, and still more preferably 0.5 to 5.0 mg/inch$^2$. In a case where the adhesion amount falls within the above range, there is a tendency for solid unevenness and blurring of the obtained recorded material to be further suppressed.

In a case of providing the ink composition adhering step after the aggregating liquid adhering step, a time interval from the end of the aggregating liquid adhering step to the start of the ink composition adhering step is preferably 10 seconds or less, more preferably 0.10 to 10 seconds, still more preferably 0.10 to 8.0 seconds, further still more preferably 0.10 to 5.0 seconds, particularly preferably 0.10 to 3.0 seconds. The time interval from the end of the aggregating liquid adhering step to the start of the ink composition adhering step is 10 seconds or less, and consequently, there is a tendency for the reaction efficiency of the aggregating liquid and the ink composition, and the image quality of the obtained recorded material to be further improved. In particular, in a case where a film thickness of the film formed by the ink composition is small, it is preferable that the time interval be short.

Ink Composition Adhering Step

The ink composition adhering step is a step of adhering the ink composition to the recording medium, which can be provided at the same time as the aforementioned aggregating liquid adhering step, or alternatively, before or after the aggregating liquid adhering step. From the viewpoint of more effectively and reliably exhibiting the effect of the invention, it is preferable that the ink composition adhering step be provided after the aggregating liquid adhering step. A device for adhering the ink composition is not particularly limited, but examples thereof include roller coating, spray coating and ink jet method. Among these, it is preferable that the ink composition be adhered by the ink jet method. By adhering the ink composition by the ink jet method, the usage amount of the ink composition can be suppressed to the minimum necessary amount since the ink composition can be applied only in the necessary amount only to the necessary part, and there is a tendency for suppressing of change in the medium surface quality and scratch resistance to be further improved.

The film thickness of the dried film after drying the recording region to which the ink composition and the aggregating liquid are adhered is preferably 0.10 to 3.0 μm, more preferably 0.10 to 2.0 μm, still more preferably 0.10 to 1.0 μm. In a case where the film thickness of the dried film is 0.10 μm or more, there is a tendency for solid unevenness and blurring of the obtained recorded material to be further suppressed. In a case where the film thickness of the dried film is 3.0 μm or less, there is a tendency for change in the glossiness degree of the obtained recorded material to be further suppressed. The "recording region" is a region on which the image on the surface of the recording medium is formed.

The recording region to which the ink composition of the recording medium is adhered includes a region having the adhered ink composition in the amount of preferably 7 mg/inch$^2$ or more, more preferably 10 mg/inch$^2$ or more, still more preferably 15 mg/inch$^2$ or more, particularly preferably 17 mg/inch$^2$ or more, extremely preferably 20 mg/inch$^2$ or more. Furthermore, the recording region to which the ink composition of the recording medium is adhered includes a region having the adhered ink composition in the amount of preferably 50 mg/inch$^2$ or less, more preferably 35 mg/inch$^2$ or less, still more preferably 30 mg/inch$^2$ or less, particularly preferably 25 mg/inch$^2$ or less. The recording region includes the region in which the amount of adhesion falls within the above range, and consequently, it is possible to obtain the useful recorded material with a high concentration, in which solid unevenness and blurring of the recorded material are more suppressed, and glossiness and durability of the recorded material are more excellent.

In the recording method according to the present embodiment, as long as the recording region has at least the region in which the amount of the deposited ink composition falls within the above range, it is preferable in view of the above points. The recording region may further include a region in which the amount of the ink composition falls outside the above range.

Furthermore, in the recording region, the amount of the ink composition in the region in which the amount of the adhered ink composition is the largest falls within the above range, thus solid unevenness and blurring of the recorded material are more suppressed.

Drying Step

The recording method according to the present embodiment includes a drying step of drying the recording region to which the aggregating liquid and the ink composition are adhered such that the amount of the organic solvent in the recording region of the recording medium is 2.0 mg/inch$^2$ or less, thereby obtaining the recorded material. The amount of the organic solvent in the recording region in the drying step is preferably 1.5 mg/inch$^2$ or less, more preferably 1.0 mg/inch$^2$ or less, still more preferably 0.5 mg/inch$^2$ or less. In a case where the amount of the organic solvent in the region of the drying step falls within the above range, it is preferable in view of particularly excellent durability. On the other hand, in a case where the amount of the organic solvent in the region in the drying step is 0.1 mg/inch$^2$ or more, the drying step can be performed in a short time or at low temperature, which is preferable in terms of speeding up of the recording method. It is more preferably 0.5 mg/inch$^2$ or more. As a method for adjusting the amount of the organic solvent within the above range, drying may be performed at a sufficient heating temperature or in heating time in the drying step.

Furthermore, in the drying step, the recording region to which the aggregating liquid and the ink composition are adhered may be dried until the water content in the recording region of the recording medium is preferably 0.2 mg/inch$^2$ or less, more preferably 0.1 mg/inch$^2$ or less, still more preferably 0.05 mg/inch$^2$ or less.

The amount of organic solvent and the water content in the recording medium in the drying step, and the water content in the recording medium in the pre-drying step can be measured by, for example, TG/DTA-GC/MS analysis method (thermogravimetry, differential thermal analysis, and gas chromatography-mass spectrometry analysis). At the time of measurement, a sample which is a component contained in the ink composition or the like is collected from the recorded material, and the organic solvent contained therein is analyzed. For the analysis, a solvent for dissolving the sample may be used in order to dissolve the sample and facilitate the analysis. The solvent for dissolving may be treated so as not to be included in the measurement result, distinguishable from the organic solvent contained in the sample.

A device for drying in the drying step is not particularly limited as long as it can dry the recording medium, but is preferably any one of radiation irradiation, air blowing, and heat transfer. It is also preferred to dry by radiation irradiation and air blowing, heat transfer and blowing, or alternatively, radiation irradiation, heat transfer and blowing. It is more preferred to dry by any one of air blowing, radiation irradiation, or heat transfer. As the radiation irradiation, for example, infrared irradiation can be considered. As the air blowing, for example, air blowing by a blower can be considered. It is preferable that the heated air be blown to the recording medium. The temperature of the wind blown to the recording medium is not limited, but is preferably 40 to 90° C., more preferably 50 to 80° C. from the viewpoint of good drying efficiency.

As heat transfer, heating by a heater can be mentioned. It is preferable that any one of air blowing, heat transfer, and radiation irradiation be used as a device of drying from the viewpoint of improving drying efficiency and durability.

From the viewpoint of further enhancing scratch resistance, it is preferable that the recording medium be dried at a temperature equal to or higher than the glass transition point of the resin particles contained in the ink composition. Although the upper limit of the temperature is not limited, it is preferably 200° C. or less, more preferably 150° C. or less, still more preferably 100° C. or less. In order to dry at such a temperature, it can be adjusted, for example, by drying with radiation irradiation or heat transfer in the drying step.

The drying step is not particularly limited, the drying step can be adjusted so that the temperature of the recording medium surface is preferably 30 to 150° C., more preferably 50 to 120° C., still more preferably 70 to 100° C. In a case where the drying step is performed by a plurality of devices, the above temperature is set to the highest temperature of each device.

In a case of drying by air blowing, the wind speed on the recording medium can be adjusted but not particularly limited to preferably 0.1 to 10 m/sec, more preferably 0.5 to 5.0 m/m/sec, still more preferably 1.0 to 2.0 m/m/sec. Furthermore, it can be adjusted so that the wind temperature on the recording medium is preferably 10 to 150° C., more preferably 30 to 100° C., still more preferably 50 to 80° C.

The drying step can be implemented, for example, by directly heating a second drying section 50 of a recording apparatus described later, and the recording medium discharged from the recording apparatus.

Pre-Drying Step

It is preferable that the recording method according to the present embodiment further include a pre-drying step of drying until the water content in the region to which the aggregating liquid of the recording medium is adhered is 0.5 mg/inch$^2$ or less, preferably 0.3 mg/inch$^2$ or less, more preferably 0.1 mg/inch$^2$ or less, after the aggregating liquid adhering step and before the ink composition adhering step. By providing the pre-drying step, there is a tendency for durability to be further improved. Moreover, the pre-drying step may be performed simultaneously with the aggregating liquid adhering step.

As a device for drying in the pre-drying step, the same device as in the drying step can be used. The upper limit of the temperature of the recording medium surface in the pre-drying step is not limited, but from the viewpoint of further enhancing the durability, it is preferably 45° C. or less, more preferably 40° C. or less, still more preferably 38° C. or less, particularly preferably 35° C. or less. In a case where the pre-drying step is carried out by a plurality of devices, the above temperature is set to the highest temperature of each devices. The temperature is preferably but not limited to 32° C. or higher.

Primary Drying Step

In the recording method according to the present embodiment, a primary drying step may be performed simultaneously with the ink composition adhering step, or alternatively, before the drying step and after the ink composition adhering step. The primary drying step is a step of quickly drying the ink composition adhered to the recording medium to the extent that the ink composition does not flow. Conditions such as device and temperature used in the primary drying step can be set independently of those in the pre-drying step. The pre-drying step, the ink composition adhering step and the primary drying step may be carried out continuously or simultaneously.

Laminating Step

The recording method according to the present embodiment may include a step of laminating the recording medium (recorded material) after the drying step. The "laminating" means performing a lamination as described later.

Recording Medium

Examples of the recording medium include an absorbing recording medium, a low-absorbing recording medium and a non-absorbing recording medium. Among these, the recording medium is preferably the low-absorbing recording medium or the non-absorbing recording medium. In a case of using the low-absorbing recording medium or the non-absorbing recording medium, the aggregating liquid is repelled on the surface thereof and thus the coagulant is difficult to be uniformly coat, so that solid unevenness and blurring are likely to occur. However, the present embodiment is particularly useful because the aggregating liquid can be prevented from being repelled by the ink composition. In a case of using the low-absorbing recording medium or the non-absorbing recording medium, the coagulant tends to remain on the surface of the recording medium without penetrating the recording medium, so that stickiness and scratch resistance of the recording surface tends to be deteriorated. However, the present embodiment, since the usage amount of the aggregating liquid can be reduced by using the aforementioned ink composition, stickiness of the recording surface can be improved, which is particularly advantageous.

The "low-absorbing recording medium" or "non-absorbing recording medium" refers to a recording medium having a water absorbing amount of 10 mL/m$^2$ or less from contact start to 30 msec in the Bristow method. The Bristow method is the most popular method as a method for measuring the amount of liquid absorption in a short time and is also adopted by Japan Paper and Pulp Technology Association (JAPAN TAPPI). For more details of the test method, refer to the standard No. 51 "Paper and Paperboard's Liquid Absorption Test Method: Bristow Method" of "JAPAN TAPPI 2000 Paper Pulp Test Method."

Furthermore, the non-absorbing recording medium or the low-absorbing recording medium can be classified according to the wettability to water on the recording surface. In particular, 0.5 μL of water droplets are dropped onto the recording surface of the recording medium, and a reduction rate of a contact angle (comparison of the contact angle at 0.5 msec after landing with the contact angle at 5 seconds) is measured to characterize the recording medium. More specifically, as the property of the recording medium, the non-absorbability of the "non-absorbing recording medium" means that the aforementioned reduction rate is less than 1%, and the low absorbability of the "low-absorbing recording medium" means that the reduction rate is 1% or more and less than 5%. The "absorbability" means that the aforementioned reduction rate is 5% or more. The contact angle can be measured using a portable contact angle meter PCA-1 (manufactured by Kyowa Interface Science) or the like.

The absorbing recording medium is not particularly limited, but examples thereof include a plain paper such as an electrophotographic paper with high permeability of the ink composition, ink jet paper (an ink jet-dedicated paper having an ink absorbing layer composed of silica particles or alumina particles, or having an ink absorbing layer composed of a hydrophilic polymer such as polyvinyl alcohol (PVA) and polyvinyl pyrrolidone (PVP)), and an art paper, a coated paper and a cast paper, each of which is used for general offset printing that the permeability of the ink composition is relatively low.

The low-absorbing recording medium is not particularly limited, but examples thereof include a coating paper provided with a coating layer for receiving oil-based ink on its surface. The coating paper is not particularly limited, but examples thereof include a printed paper such as an art paper, a coated paper, and a matte paper.

The non-absorbing recording medium is not particularly limited, but examples thereof include a plastic film without an ink absorbing layer, a substrate such as a paper on which the plastic is coated, a substrate such as a paper to which a plastic film is bonded, and the like. Examples of the plastic referred herein include polyvinyl chloride, polyethylene terephthalate, polycarbonate, polystyrene, polyurethane, polyethylene, and polypropylene.

In addition to the aforementioned recording medium, a non-absorbing or low-absorbing recording medium against the ink, such as a metal plate of iron, silver, copper, aluminum or the like, glass or the like can be used.

In particular, the recording medium is preferably in the form of a roll. The roll-shaped recording medium can be used upon recording in such a manner that the recording head is scanned with respect to the recording medium once and the recording medium is wound by a take-up roller. In a case where such a recording medium is used, when whole recording cannot be carried out at once with one-time feeding because of the large numbers of colored ink to be used, the recorded material can be obtained by repeating several times a procedure that the recording head is scanned with respect to the recording medium once and the recording medium is wound by the take-up roller. However, since the recording medium is in the form of a roll, cracks tend to occur easily in the layer formed of the polymer in the recorded material. In a case where the cracks occur, the image quality of the obtained recorded material tends to be deteriorated due to, for example, the aggregating liquid penetrating into the cracks. Meanwhile, a coating film formed of the ink composition, which is obtained by the recording method according to the present embodiment, is hardly cracked. Therefore, in a case where the recording medium having such a shape is used, the invention is particularly useful.

Recorded Material

The recorded material obtained by the recording method according to the present embodiment can be used for display or the like as it is. Since the recorded material excellent in lamination resistance can be obtained by the recording method according to the present embodiment, it is preferable that the recorded material be used after being laminated. In particular, it is preferable that the recorded material be used for preparing a laminated film. Specifically, the laminate film can be produced by laminating a protective film on the recording surface of the recorded material, for example, by laminating films. Although not particularly limited, a publicly known adhesive may be adhered to the recording surface of the recorded material and the film may be adhered thereto, or alternatively, the film to which the adhesive is adhered may be adhered to the recording surface of the recorded material. Alternatively, the laminated film can be manufactured by extruding a molten resin onto the recording surface of the recorded material using the molten resin in which the film is melted, and by molding the molten resin as a film on the recording surface of the recorded material. For example, a film made of resin can be used as a material of the film used for lamination. Laminating the recorded materials preferable from the viewpoint of excellent light resistance of the recorded material and excellent protection in a case of excessive handling such as hitting a solid object on the recorded material.

After the recorded material and the film are bonded to each other, it is preferable that the recorded material and the film be further adhered to each other sufficiently by further heating or pressing at room temperature.

Recording Apparatus

A recording apparatus according to the present embodiment that performs recording by the recording method according to the present embodiment will be described. The recording apparatus according to the present embodiment is not particularly limited as long as it is a recording apparatus capable of recording by the recording method according to the present embodiment. FIGURE is a side view schematically showing the overall outline of an example of an ink jet recording apparatus 1 that can be used in the present embodiment. As shown in FIGURE, the ink jet recording apparatus 1 includes a feeding section 10 for a recording medium, a transport section 20, a recording section 30, a drying device 90, a drying device 100, and a discharging section 70.

The drying device 90 includes a first drying section 40 for drying the aggregating liquid and for primarily drying the ink, a second drying section 50 for drying the recorded material obtained by the recording method according to the present embodiment. The drying device 100 is a drying mechanism for air blowing which is provided above the recording medium, and wind is sent to the recording medium from above to dry the aggregating liquid or to primarily dry the ink.

Further, the feeding section 10 is provided so as to be able to feed the roll-shaped recording medium F to the transport section 20. In particular, the feeding section 10 has a roll medium holder 11, and the roll medium holder 11 holds the roll-shaped recording medium F. The feeding section 10 is configured to feed the recording medium F to the transport section 20 on the downstream side in a feeding direction Y by rotating the roll-shaped recording medium F.

The transport section 20 is provided so that the recording medium F sent from the feeding section 10 is conveyed to the recording section 30. In particular, the transport section 20 has a first feed roller 21, and is configured to convey the sent recording medium F further to the recording section 30 on the downstream side in the feeding direction Y.

The recording section 30 is provided so as to apply the aggregating liquid to the recording medium F sent from the transport section 20 and eject the ink composition for recording. In particular, the recording section 30 includes heads 31 and 32 for performing the aggregating liquid adhering step, a recording head 33 for performing the ink composition adhering step, and a platen 34 serving as a medium supporting section. However, in this embodiment, the head 31 is not used. The head 32 and the head 33 are mounted on the same carriage (not shown). The carriage carries out scanning (main scanning) in which the ink composition and the aggregating liquid are ejected from the head while being moved from frontward to the backward of FIGURE to be adhered on the recording medium facing the head. Recording is carried out by alternately performing scanning and transport (subscanning) of the recording medium. That is, a multi-pass recording method is performed in which printing is performed by scanning several times.

On the other hand, each head has a length not less than a recording width in a width direction of the recording medium. Accordingly, it is also possible to carry out a one-pass recording method in which recording is carried out by performing scanning once for ejecting the aggregating liquid or ink from the head while transport the recording medium to be adhered on the recording medium, without moving each head during recording.

Among these, the platen 34 is provided so as to be able to support the recording medium F from the back side. The platen 34 is provided with the first drying section 40 (corresponding to the drying device in the aforementioned primary drying step) for drying the aggregating liquid adhered to the recording medium F and the ink composition adhered to the recording medium F. Further, a second feed roller 43 is provided on the downstream side of the platen 34 in the feeding direction Y. The second feed roller 43 is configured to feed the recorded recording medium F to the second drying section 50 on the downstream side in the feeding direction Y. The first drying section 40 is also provided with an air blowing apparatus (not shown).

Furthermore, the second drying section 50 (corresponding to the drying device in the aforementioned drying step) is configured to further dry the aggregating liquid adhered to the recording medium F and the ink composition adhered to the recording medium F. The second drying section 50 has, although not shown, a blower mechanism that blows air to the recording medium, a heat transfer mechanism that heats a supporting section that is in contact with the recording medium and that is conveyed along the surface of the recording medium to transfer heat from the supporting section to the recording medium, and a radiation irradiation mechanism that radiates infrared rays to the recording medium to heat the recording medium.

Furthermore, a third feed roller 65 is provided near an outlet 64 of the second drying section 50. The third feed roller 65 is disposed so as to be in contact with a rear surface of the recording medium F, and is configured to feed the recording medium F to the discharging section 70 on the downstream side in the feeding direction Y.

Further, the discharging section 70 is provided so that the recording medium F sent from the second drying section 50 can be further sent to the downstream side in the feeding direction Y and discharged to the outside of the ink jet recording apparatus 1. In particular, the discharging section 70 includes a fourth feed roller 71, a fifth feed roller 72, a sixth feed roller 73, a seventh feed roller 74, and a wind-up roller 75. Among these, the fourth feed roller 71 and the fifth feed roller 72 are disposed so as to contact the surface of the recording medium F. The sixth feed roller 73 and the seventh feed roller 74 are disposed so as to form a pair of rollers. The recording medium F discharged by the sixth feed roller 73 and the seventh feed roller 74 is provided so as to be wound by the wind-up roller 75.

Examples

Hereinafter, the invention will be described more concretely with reference to examples. The invention is not limited to the following examples.

Materials for Aggregating Liquid and Ink Composition

The main materials for the aggregating liquid and the ink composition used for preparing the recorded material described below are as follows.

Colorant

Organic pigment dispersion (pigment: C.I. Pigment Blue 15:3, dispersant resin: styrene acrylic water-soluble resin).

Coagulant

Preparation of Aggregating Liquid and Ink Composition

The organic pigment dispersion liquid is a dispersion liquid prepared by dispersing a pigment in water using the pigment and a dispersant resin. The dispersion liquid and other respective materials were mixed in the composition listed in the following Table 1 and sufficiently stirred to obtain an aggregating liquid and an ink composition. In the following Table 1, the unit of the numerical value is mass %, and the total sum is 100.0 mass %. In the table, as described above, triisopropanolamine was considered as an organic solvent, and the total amount of resin solvent/organic solvent was calculated by including the amount of triisopropanolamine in the total amount of organic solvent.

TABLE 1

|  |  | Aggregating Liquid | | | Ink Composition | | | | |
|---|---|---|---|---|---|---|---|---|---|
|  |  | R-1 | R-2 | R-3 | C-1 | C-2 | C-3 | C-4 | C-5 |
| Colorant | Colorant: organic pigment dispersion (pigment: 15 mass %, dispersant resin: 3 mass %) | — | — | — | 33.33 (6.25) | 33.33 (6.25) | 33.33 (6.25) | 33.33 (6.25) | 33.33 (6.25) |
| Coagulant | Magnesium sulfate and heptahydrate (polyvalent metal salts) | 7 | — | — | — | — | — | — | — |
|  | Malonic acid (organic acid) | — | 7 | — | — | — | — | — | — |
|  | Polyallylamine resin (free type) (cationic resin, 20 mass % aqueous solution) | — | — | 35 (7) | — | — | — | — | — |
| Resin Particles | Styrene-acrylic acid copolymer emulsion Tg: 80° C. (40% dispersion), SP value: 12.5 | — | — | — | 20 (8) | 20 (8) | 20 (8) | 20 (8) | 20 (8) |
| Wax | Nopcoat PEM-17 (polyethylene wax emulsion) melting point: 103° C. (40% dispersion) | — | — | — | 2.5 (1) | 2.5 (1) | 2.5 (1) | 2.5 (1) | 2.5 (1) |
| Organic Solvent | Propylene glycol (aqueous organic solvent) boiling point: 189° C., SP value: 14.2 | 15 | 15 | 10 | 9 | — | 11 | — | — |
|  | 1,3-Butylene glycol (aqueous organic solvent) boiling point: 208° C., SP value: 13.6 | 5 | 5 | 5 | 9 | 10 | 9 | 8 | 5 |
| Resin Solvent | 1,2-Hexanediol (aqueous organic solvent) boiling point: 224° C., SP value: 12.2 | 5 | 5 | 5 | 3 | 3 | 3 | 3 | 3 |
|  | 2-Pyrrolidone (aqueous organic solvent) boiling point: 245° C., SP value: 12.9 | 15 | 15 | 15 | 7 | 15 | 5 | 17 | 15 |
|  | Glycerin (aqueous organic solvent) boiling point: 290° C., SP value: 16.7 | — | — | — | — | — | — | — | 5 |
| Additives  Surfactant | BYK 348 (silicone surfactant) | 0.5 | 0.5 | 0.5 | 0.5 | 0.5 | 0.5 | 0.5 | 0.5 |
| pH Adjusting Agent | Triisopropanolamine boiling point: 305° C. | 0.1 | 0.1 | 0.1 | 3 | 3 | 3 | 3 | 3 |
| Water | Ion exchanged water | Residual | Residual | Residual | Residual | Residual | Residual | Residual | Residual |
| Resin Solvent/(Total Amount of Organic Solvent) | | — | — | — | 32% | 58% | 26% | 65% | 58% |

*The numerical values in parentheses indicate the solid content.

Magnesium sulfate and heptahydrate (polyvalent metal salts);

malonic acid (organic acid); and polyallylamine resin (free type) (cationic resin, 20 mass % aqueous solution).

Resin Particles

Styrene-acrylic acid copolymer emulsion.

Wax

Nopcoat PEM-17 (trade name, manufactured by San Nopco Limited).

Organic Solvent

Propylene glycol;

1,3-butylene glycol;

1,2-hexanediol;

2-pyrrolidone; and glycerin.

Surfactant

BYK 348 (trade name, manufactured by BYK Chemie)

pH Adjusting Agent

Triisopropanolamine.

Water

Ion exchanged water.

Recording Test (Preparation of Recorded Material)

An ink jet type printer as shown in FIGURE was prepared by manufacturing a remodeled machine of SC-S 40650 (trade name, manufactured by Seiko Epson Corporation), in which air blowing device and heat transfer device (hot plate heater) are provided in the platen as a primary drying step, and air blowing device, radiation irradiation device (infrared irradiation apparatus) and heat transfer device (hot plate heater) are provided on the downstream in a transport direction of the recording medium so that the drying temperature and drying time of each drying device can be sufficiently adjusted as the drying step. Next, a recording medium (Scotchcal graphic film IJ 180-10, manufactured by 3M Company, made of polyvinyl chloride) was transferred to the printer, and one of nozzle rows of an aggregating liquid head was filled with the aggregating liquid, and one of nozzle rows of an ink head was filled with the ink composition. The one nozzle row has a nozzle density of 360 dpi and 360 nozzles.

The aggregating liquid was applied to the recording region by the ink jet method according to the adhesion amount listed in Table 2. Thereafter, by the pre-drying step shown in Table 2, the recording medium was dried until the residual moisture amount reached the amount listed in Table 2 on an aggregating liquid adhered surface to which the aggregating liquid was adhered.

Next, the ink composition filled in the recording head was overlapped on the recording region to which the aggregating liquid was adhered, and ink jet coating was carried out according to the deposition amount listed in Table 2. During the ink composition adhering step, the ink composition adhered to the recording medium was dried at the same temperature as that of the pre-dry drying step. Recording region was set to 5×5 cm, adhesion of coagulant and ink was respectively adjusted with a recording resolution of 1440× 1440 dpi at maximum so that the adhesion amount in the table was obtained and a adhered dot density was made as uniform as possible.

Thereafter, while transport the recording medium to the downstream in the transport direction, the drying time was adjusted for each example so that the recording medium was dried until the amount of the remaining organic solvent reached the amount listed in Table 2 on an ink composition adhered surface to which the ink composition was adhered by the drying step shown in Table 2, thereby discharging the recording medium and obtaining the recorded material.

Adjustment of the residual water content and the residual organic solvent amount by the pre-drying step and the drying step for each example was achieved by adjusting the drying time in the pre-drying step and the drying step. The hot plate as the drying step is a method in which the heater is disposed under the supporting section of the recording medium in a transport path of the recording medium and the recording medium is heated due to heat transfer from the heater to the recording medium via the supporting section of the recording medium.

In each example, the drying time in the drying step required to reach the residual organic solvent amount listed in Table 2 was relatively long as compared with each comparative example. In Examples 8, 10, 12, 14, and 20, the drying time was particularly long as compared with other examples.

Residual Water Content

Immediately after the pre-drying step, a part of the applied ink layer was taken out and analyzed with a TG/DTA-GC/MS analysis system (TG/DTA apparatus: STA 7200, GC/MS apparatus: SCION SQ Select 436-GC, collectively manufactured by Hitachi High-Tech Sciences) to measure the residual water content. Apart from performing the recording until the drying step, the measurement is easily carried out by performing the primary drying step under the same conditions as above, and collecting the sample for measurement from the recording medium immediately after the pre-drying step.

Amount of Residual Organic Solvent

Upon completion of the recording, a portion of the applied ink layer was taken out one hour after the recorded material was left to have at room temperature, and the amount of the remaining organic solvent was measured using the TG/DTA-GC/MS analysis system (TG/DTA apparatus: STA 7200, GC/MS apparatus: SCION SQ Select 436-GC, collectively manufactured by Hitachi High-Tech Sciences).

Image Quality (Solid Unevenness)

Using the same method as in the above "Preparation of Recorded Material", a recorded material was obtained as an image of a solid pattern and the image quality (solid unevenness) was visually evaluated according to the following evaluation criteria. The obtained results are summarized in Table 2.

Evaluation Criteria

A: The solid pattern image is uniformly formed.

B: Only a partial unevenness is observed in the solid pattern image, but there is no problem in practical use.

C: Some unevenness is observed in the solid pattern image.

D: Unevenness is clearly appeared in the solid pattern image.

Image Quality (Blurring)

Recording was carried out in the same manner as in "Preparation of Recorded Material". However, the recording pattern was a single line extending in the main scanning direction. The recorded material was observed with a magnifying glass and image quality (blurring) was evaluated according to the following evaluation criteria. The obtained results are summarized in Table 2.

Evaluation Criteria

A: Ae ruled line width in the image is uniform, and there is no connection between the ruled lines.

B: Part of the ruled line width in the image is nonuniform, but there is no problem in practical use, nor connection between the ruled lines.

C: The ruled line width in the image is nonuniform, and connection between the ruled lines is also recognized.

D: The ruled line width in the image is remarkably nonuniform and almost no clearance between the ruled lines is recognized.

Durability (Scratch Resistance)

The recorded material obtained in "Preparation of Recorded Material" was rubbed back and forth by a rubbing cloth with a white cotton cloth (according to JIS L 0803) attached to a JSPS rubbing fastness tester AB-301 (trade name, manufactured by Tester Sangyo) while applying a load of 200 g was applied until the recorded material was peeled off or 20 times. Peeling of the recorded material on the recording medium was visually observed, and scratch resistance was evaluated according to the following evaluation criteria. The obtained results are summarized in Table 2.

Evaluation Criteria

A: No rubbing traces are observed on the image and adhesion of the ink composition to the white cotton cloth was not observed.

B: Adhesion of the ink composition to the image is observed on the image or the white cotton cloth.

C: Scratches on the image and adhesion of the ink composition to the white cotton cloth are observed.

D: The image peels off, and the ink composition remarkably adheres to the white cotton cloth.

Durability (Blocking Resistance)

The recorded material obtained in "Preparation of Recorded Material" was left for 24 hours with a load of 500 g/cm$^2$, under the environment of 20 to 25° C./40 to 60% RH in a state where a rear surface of the recording medium was overlapped on the printed surface of the recorded material. Thereafter, the peeling of the image of the recorded material and transfer to the rear surface were visually observed and the durability (blocking resistance) was evaluated according to the following evaluation criteria. The obtained results are summarized in Table 2.

Evaluation Criteria

A: Peeling is not recognized in the image of the recording pattern, and although the recorded material is overlapped, the transfer of the image is not observed.

B: Although peeling is not recognized in the image of the recording pattern, transfer of the image is slightly recognized when the recorded material is overlapped.

C: Peeling is recognized in the image of the recording pattern, and transfer of the image is recognized when the recorded material is overlapped.

D: The image of the recording pattern is largely peeled off, and when the recorded material is overlapped, the transfer of the image is recognized.

Durability (Lamination Resistance)

A laminate film GIL-1148 (trade name, manufactured by LINTEC Corporation) was laminated on the recording surface of the recorded material obtained in "Preparation of Recorded Material". Thereafter, durability (lamination resistance) was evaluated according to the following evaluation criteria. The obtained results are summarized in Table 2.

Evaluation Criteria

A: Blurring is not observed in the image of the recording pattern, and floating of the laminate film is not observed.

B: Although slight blurring is observed in the image of the recording pattern, the floating of the laminate film is not observed.

C: Blurring is observed in the image of the recording pattern, and floating of the laminate film is also observed.

D: Blurring of the image of the recording pattern and floating of the laminate film are remarkably observed. Clogging Resistance Recording was carried out under the same conditions as in "Preparation of Recorded Material", and the clogging resistance of the ink ejection nozzle was evaluated according to the following evaluation criteria. The obtained results are summarized in Table 2.

Evaluation Criteria

A: After idle run for 3 hours without ejecting from the recording head, the number of nozzles of occurring ejection failure or of which ejection direction is shifted is zero.

B: After idle run for 1 hour without ejecting from the recording head, the number of nozzles of occurring ejection failure or of which ejection direction is shifted is zero. However, after idle run for 3 hours without ejecting from the recording head, the number of nozzles of occurring ejection failure or of which ejection direction is shifted is at least one.

C: After idle run for 1 hour without ejecting from the recording head, the number of nozzles of occurring ejection failure or of which ejection direction is shifted is 1 to 5.

D: After idle run for 1 hour without ejecting from the recording head, the number of nozzles of occurring ejection failure or of which ejection direction is shifted is 6 or more.

TABLE 2

| | | | Example | | | | | | | | | | | | | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| | Aggregating Liquid (Adhered Amount: 4 mg/inch$^2$) | | R-1 | R-1 | R-1 | R-1 | R-1 | R-1 | R-1 | R-1 | R-1 | R-2 | R-2 | R-3 | R-3 | R-1 |
| Pre-drying | Air Blowing | Wind speed on recording medium (m/sec) | 2 | 2 | 2 | 2 | 2 | 2 | 2 | 2 | 2 | 2 | 2 | 2 | 2 | 2 |
| | | Wind temperature on recording medium (° C.) | 25 | 25 | 30 | 30 | 30 | 30 | 30 | 30 | 30 | 30 | 30 | 30 | 30 | 30 |
| | Heat Transfer | Hot plate heating (paper temperature: ° C.) | 30 | 35 | 30 | 35 | 35 | 35 | 35 | 35 | 35 | 35 | 35 | 35 | 35 | 35 |
| | Residual Water Content (mg/inch$^2$) | | 0.5 | 0.31 | 0.21 | 0.1 | 0.1 | 0.1 | 0.1 | 0.1 | 0.1 | 0.1 | 0.1 | 0.1 | 0.1 | 0.1 |
| | Ink Composition | | C-1 | C-1 | C-1 | C-1 | C-1 | C-1 | C-1 | C-1 | C-2 | C-1 | C-2 | C-1 | C-2 | C-1 |
| | Adhered Amount of Ink Composition (mg/inch$^2$) | | 20 | 20 | 20 | 20 | 20 | 20 | 20 | 20 | 20 | 20 | 20 | 20 | 20 | 20 |
| Drying | Air Blowing | Wind speed on recording medium (m/sec) | 1.5 | 1.5 | 2 | 2 | 1.5 | 1.5 | 2 | 2 | 2 | 2 | 2 | 2 | 2 | 2 |
| | | Wind temperature on recording medium (° C.) | 50 | 50 | 50 | 50 | 70 | 70 | 70 | 70 | 70 | 70 | 70 | 70 | 70 | 70 |
| | Radiation Irradiation | Irradiation of infrared rays (surface temperature of recording medium: ° C.) | — | 80 | — | 80 | — | 80 | — | 80 | 80 | 80 | 80 | 80 | 80 | 80 |
| | Heat Transfer | Hot plate heating (surface temperature of recording medium: ° C.) | 80 | — | 80 | — | 80 | — | 80 | — | — | — | — | — | — | 80 |
| | Finished Image | Amount of residual organic solvent (mg/inch$^2$) | 2 | 1.8 | 1.8 | 1.2 | 1.8 | 1.2 | 1.5 | 0.8 | 1 | 0.8 | 1 | 0.8 | 1 | 0.5 |
| Image Quality | Solid Unevenness | | C | B | B | A | A | A | A | A | A | A | A | A | A | A |
| | Blurring | | B | B | A | A | A | A | A | A | A | A | A | A | A | A |
| Durability | Scratch Resistance | | B | B | B | B | B | B | A | A | A | A | A | A | A | A |
| | Blocking Resistance | | C | B | B | A | C | A | B | A | A | A | A | A | A | A |
| | Lamination Resistance | | B | B | B | A | B | A | B | A | A | A | A | A | A | A |
| | Clogging Resistance | | A | A | A | A | A | A | A | A | B | A | B | A | B | A |

| | | | Example | | | | | | Comparative Example | | | | | | | |
|---|---|---|---|---|---|---|---|---|---|---|---|---|---|---|---|---|
| | | | 15 | 16 | 17 | 18 | 19 | 20 | 1 | 2 | 3 | 4 | 5 | 6 | 7 | 8 |
| | Aggregating Liquid (Adhered Amount: 4 mg/inch$^2$) | | R-2 | R-2 | R-1 | R-1 | R-1 | R-1 | R-1 | R-1 | R-1 | R-1 | R-1 | — | R-1 | — |
| Pre-drying | Air Blowing | Wind speed on recording medium (m/sec) | 2 | 2 | 2 | 2 | 2 | 2 | 0 | 2 | 2 | 2 | 2 | 2 | 2 | 2 |
| | | Wind temperature on recording medium (° C.) | 30 | 30 | 30 | 25 | 25 | 25 | 25 | 25 | 30 | 30 | 30 | 30 | 30 | 30 |
| | Heat Transfer | Hot plate heating (paper temperature: ° C.) | 35 | 35 | 30 | 35 | 35 | 35 | 25 | 25 | 35 | 35 | 35 | 35 | 30 | 35 |

TABLE 2-continued

| | | | | | | | | | | | | | | | | |
|---|---|---|---|---|---|---|---|---|---|---|---|---|---|---|---|---|
| | | Residual Water Content (mg/inch$^2$) | 0.1 | 0.1 | 0.31 | 0.31 | 0.31 | 0.31 | 1.05 | 0.63 | 0.1 | 0.1 | 0.1 | — | 0.1 | — |
| | | Ink Composition | C-3 | C-4 | C-5 | C-1 | C-1 | C-1 | C-1 | C-1 | C-1 | C-1 | C-1 | C-1 | C-5 | C-1 |
| | | Adhered Amount of Ink Composition (mg/inch$^2$) | 20 | 20 | 20 | 10 | 25 | 25 | 20 | 20 | 20 | 20 | 20 | 20 | 20 | 20 |
| Drying | Air Blowing | Wind speed on recording medium (m/sec) | 2 | 2 | 1.5 | 1.5 | 1.5 | 1.5 | — | 2 | 2 | 2 | 2 | 2 | 1.5 | 2 |
| | | Wind temperature on recording medium (° C.) | 50 | 50 | 70 | 50 | 60 | 65 | — | 25 | 50 | 70 | 50 | 50 | 50 | 50 |
| | Radiation Irradiation | Irradiation of infrared rays (surface temperature of recording medium: ° C.) | — | — | — | 75 | 95 | 100 | — | — | — | — | 50 | — | — | — |
| | Heat Transfer | Hot plate heating (surface temperature of recording medium: ° C.) | 80 | 80 | 100 | — | — | — | — | 50 | — | — | 50 | 80 | 80 | 50 |
| | Finished Image | Amount of residual organic solvent (mg/inch$^2$) | 2 | 2 | 1.8 | 1.8 | 1.8 | 0.8 | 7.5 | 4 | 2.8 | 2.5 | 2.2 | 1.5 | 2.2 | 2.2 |
| Image Quality | | Solid Unevenness | A | A | C | A | C | C | D | C | A | A | A | D | C | D |
| | | Blurring | A | A | B | A | C | C | D | C | A | A | A | D | B | D |
| Durability | | Scratch Resistance | B | A | C | C | B | A | D | C | C | C | C | B | D | B |
| | | Blocking Resistance | C | C | C | A | C | A | D | D | D | D | D | B | D | C |
| | | Lamination Resistance | B | B | B | A | B | A | D | D | D | C | C | B | D | C |
| | | Clogging Resistance | C | D | A | A | A | A | A | A | A | A | A | A | A | A |

As a result of the recording test and evaluation, the following was found.

In each of Examples, since the drying time in the drying step required to reach the residual organic solvent amount listed in Table 2 was comparatively long as compared with respective Comparative Examples. Thus, it has been found that, in order to reduce the amount of organic solvent in the drying step to 2.0 mg/inch$^2$ or less, the drying step time is required to be carefully adjusted to sufficiently dry the recording medium by measuring the amount of organic solvent in the recorded material after drying. In Comparative Examples 3 to 5 and 7, although the drying step time was relatively short, the image quality was excellent and the scratch resistance was not inferior. From this, it has been found that it is not always necessary to carefully dry as much as Examples in the drying step, if the invention focuses on obtaining excellent image quality and scratch resistance.

In each of Examples, the amount of the residual organic solvent in the drying step was 2.0 mg/inch$^2$ or less by using the aggregating liquid. The image quality was excellent, the blocking resistance and the lamination resistance were also excellent.

Meanwhile, in each of Comparative Examples, the aggregating liquid was not used and the amount of the residual organic solvent in the drying step was not 2.0 mg/inch$^2$ or less. Either image quality, blocking resistance or lamination resistance was inferior.

In detail, from Examples 1 to 8 and 14, as the amount of the organic solvent in the drying step was smaller, the blocking resistance and the lamination resistance were particularly excellent, and the scratch resistance was also particularly excellent.

Comparing of Examples 8, 10 and 12, any aggregating liquid is excellent in image quality and durability.

Comparing of Examples 9, 6 and 8, the lower a ratio of the resin solvent/total amount of the organic solvent in the ink is, the more excellent the clogging resistance is.

Comparing of Examples 17 and 2, the durability and the image quality are particularly excellent as the content of the high boiling point solvent in the ink is smaller. In Example 17, although the content of the high boiling point solvent in the ink is large, the heating temperature in the drying step is increased, but the drying time taken to reach the same amount of the organic solvent in the drying step is longer than in Example 2, which is undesirable.

Comparing of Examples 18, 19 and 2, it has been found that the smaller the ink adhesion amount, the better the blocking resistance, the lamination resistance and the image quality, while more the ink adhesion amount, the better the scratch resistance.

Comparing of Examples 20 and 19, and Examples 1 and 2, it has been found, in a case the ink adhesion amount is large, when the amount of the organic solvent in the drying step is large, the durability decreases, but when the amount of the organic solvent mount is small, the durability is particularly excellent. Consequently, it has been found that by increasing the ink adhesion amount and reducing the amount of the organic solvent in the drying step, the recorded material is particularly excellent in durability.

In Comparative Examples 6 and 8, the aggregating liquid was not used and the image quality was inferior, but in Comparative Example 8, although the amount of the organic solvent in the drying step was large, the durability was relatively good. Consequently, it has been found that it is necessary to reduce the amount of the organic solvent in the drying step in order to obtain excellent durability when obtaining excellent image quality by using the aggregating liquid. In Comparative Examples 6 and 8, the time required for the drying step was relatively long as compared with other Examples in which the amount of the organic solvent in the drying step was about the same. Consequently, it is assumed that a long period of time is required for the drying step since solid-liquid separation of the ink composition does not progress when no aggregating liquid is used.

In Comparative Example 7, an ink containing a high amount of the high boiling point solvent was used as the ink, but the durability was particularly inferior to that of Comparative Example 5. It is assumed that the heat of the drying step is spent to dry the high boiling point solvent and it is insufficient to sufficiently form a film from the resin of the ink.

The entire disclosure of Japanese Patent Application No. 2017-190597, filed Sep. 29, 2017 is expressly incorporated by reference herein.

What is claimed is:

1. A recording method using an ink composition containing a colorant, resin particles, an organic solvent and water, and an aggregating liquid containing a coagulant for aggregating components of the ink composition, the method comprising:

adhering the aggregating liquid to a recording region of a recording medium;

adhering the ink composition to the recording region by ejecting the ink composition from a recording head; and after adhering the aggregation liquid and the ink composition to the recording region, drying the recording region to which the aggregating liquid and the ink composition are adhered such that an amount of the organic solvent in the recording region is 2.0 mg/inch$^2$ or less to obtain a recorded material, wherein, in the drying, a temperature of a surface of the recording medium is 70° C. or more.

2. The recording method according to claim 1,
wherein the content of an organic solvent having a normal boiling point exceeding 280° C. is 3.0 mass % or less based on the total amount of the ink composition.

3. A recording apparatus for performing a recording by the recording method according to claim 2.

4. The recording method according to claim 1, further comprising:
drying the recording region to which the aggregating liquid is adhered such that the water content of the recording region is 0.5 mg/inch$^2$ or less before the adhering of the ink composition.

5. A recording apparatus for performing a recording by the recording method according to claim 4.

6. The recording method according to claim 1,
wherein the aggregating liquid contains an organic solvent and water.

7. A recording apparatus for performing a recording by the recording method according to claim 6.

8. The recording method according to claim 1,
wherein the recording medium is dried at a temperature equal to or higher than the glass transition point of the resin particles contained in the ink composition in the drying.

9. A recording apparatus for performing a recording by the recording method according to claim 8.

10. The recording method according to claim 1,
wherein the recording medium is a low-absorbing recording medium or a non-absorbing recording medium.

11. A recording apparatus for performing a recording by the recording method according to claim 10.

12. The recording method according to claim 1,
wherein the recording region includes a region in which an amount of the adhered ink composition is 9 to 25 mg/inch$^2$ in the adhering of the ink composition.

13. A recording apparatus for performing a recording by the recording method according to claim 12.

14. The recording method according to claim 1,
wherein the ink composition further contains a wax.

15. The recording method according to claim 1,
wherein the drying is performed by any one of air blowing, radiation irradiation, and heat transfer.

16. The recording method according to claim 1,
wherein the organic solvent contained in the ink composition contains a resin solvent.

17. The recording method according to claim 16,
wherein the content of the resin solvent is 30 to 80 mass % based on the total amount of the organic solvent contained in the ink composition.

18. The recording method according to claim 1,
wherein the coagulant contained in the aggregating liquid is at least one of cationic resin, organic acid, and polyvalent metal salt.

19. The recording method according to claim 1,
wherein the recorded material is laminated.

20. A recording apparatus for performing a recording by the recording method according to claim 1.

21. The recording method according to claim 1, wherein in the drying, the temperature of the surface of the recording medium is 75° C. or more.

22. The recording method according to claim 1, wherein in the drying, the temperature of the surface of the recording medium is 70° C. to 150° C.

* * * * *